US006939630B2

(12) United States Patent
Sotomura et al.

(10) Patent No.: US 6,939,630 B2
(45) Date of Patent: Sep. 6, 2005

(54) COMPOSITE ELECTRODE FOR REDUCING OXYGEN

(75) Inventors: Tadashi Sotomura, Kashiwara (JP); Takeo Ohsaka, Machida (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 298 days.

(21) Appl. No.: 10/230,096

(22) Filed: Aug. 29, 2002

(65) Prior Publication Data

US 2003/0091889 A1 May 15, 2003

(30) Foreign Application Priority Data

Aug. 29, 2001 (JP) .................................... P 2001-259283

(51) Int. Cl.[7] .......................... H01M 4/86; H01M 4/90; H01M 8/04; H01M 12/06
(52) U.S. Cl. ............................ 429/13; 429/27; 429/40; 429/43; 429/44; 429/50
(58) Field of Search .......................... 429/40–44, 13, 429/27, 50; 502/101, 300, 324

(56) References Cited

U.S. PATENT DOCUMENTS

| | | | |
|---|---|---|---|
| 4,407,907 A | | 10/1983 | Takamura et al. |
| 4,655,887 A | * | 4/1987 | Oda et al. .................. 205/524 |
| 5,824,429 A | | 10/1998 | Das et al. |
| 6,335,112 B1 | | 1/2002 | Asukabe et al. |
| 6,465,128 B1 | * | 10/2002 | Sunstrom et al. ......... 429/218.1 |

FOREIGN PATENT DOCUMENTS

| | | | | |
|---|---|---|---|---|
| JP | 63-21315 | 5/1988 | | |
| JP | 2-30141 | 7/1990 | | |
| JP | 2-30142 | 7/1990 | | |
| JP | 6-73060 | 3/1994 | | |
| JP | 11-253811 | 9/1999 | | |
| JP | 2000106203 A | * 4/2000 | ............ H01M/8/02 | |

OTHER PUBLICATIONS

Mao et al. "A novel alkaline air electrode based on a combined use of cobalt hexadecafluoro–phthalocyanine and manganese oxide", Electrochemical Acta 49 (2004), pp. 2515–2521.*

Gojkovic "Heat–treated iron(III) tetramethoxyphenyl porphyrin chloride supported on high–area carbon as an electrocatalyts for oxygen reduction", Electrochemica Acta 45 (1999), pp. 889–897.*

"ELECTROCATALYSIS", edited by Jacek Upkowski and Philip N. Ross, published by Wiley–Vch, pp. 204–205 and 232–235 (1998).

* cited by examiner

*Primary Examiner*—Gregg Cantelmo
(74) *Attorney, Agent, or Firm*—Wenderoth, Lind & Ponack, L.L.P.

(57) ABSTRACT

A composite electrode for reducing oxygen that provides the quasi four-electron reduction at selectivity of nearly 100% is provided. The composite electrode includes an electrochemical catalyst A that produces hydrogen peroxide by reducing oxygen and a catalyst B that decomposes the produced hydrogen peroxide to oxygen.

21 Claims, 5 Drawing Sheets

COMPOSITE ELECTRODE FOR REDUCING OXYGEN

FIELD OF THE INVENTION

The invention relates to a composite electrode for reducing oxygen in which molecular oxygen is electrochemically reduced. Specifically, the composite electrode for reducing oxygen of the present invention is used for the oxygen electrode or air electrode of an electrochemical device including an air cell such as a zinc-air cell, an aluminum-air cell or a sugar-air cell, and a fuel cell such as an oxygen-hydrogen fuel cell or a methanol fuel cell.

DESCRIPTION OF THE RELATED ART

It has been generally known that when oxygen ($O_2$) is electrochemically reduced, a super oxide is produced at one-electron reduction, hydrogen peroxide is produced at two-electron reduction and water is produced at four-electron reduction (ELECTROCATALYSIS, pp204–205 (1998) edited by JACEK KIPKOWSKI, PHILIP N. ROSS and published by WILEY-VCH Co.). In order to obtain an electrochemical device with a high capacity, high voltage and high current, it is required that the electrochemical reduction of oxygen which accompanies as many as possible electrons transferred is proceeded at a potential being as noble (plus) as possible and further at an overpotential being as little as possible.

Namely, a catalyst capable of carrying out the four-electron reduction at higher potential and further at lesser overvpotential is preferable. Several trials for obtaining the catalyst have been reported. In Japanese Patent Publications No.2-30141 and No.2-30142, there is proposed a catalyst comprising a porous molding made of an electroconductive powder which supported metal chelate compounds such as iron phthalocyanine and cobalt porphyrin which have a capability of reducing oxygen, and a fluorine resin. When the dimer (binuclear complex) of a metal chelate compound is used, it is described that higher capability of reducing oxygen (four-electron reduction capability) can be expected and a high power air cell can be expected.

The technology of a catalyst of reducing oxygen using a macrocyclic complex such as a cobalt porphyrin binuclear complex in which a transition metal such as Cr, Mn, Fe or Co is a central metal is described in the aforementioned ELECTROCATALYSIS, pp232–234 (1998), which is published by WILEY-VCH Co. A manganese binuclear complex catalyst for reducing oxygen is proposed in Japanese Patent Publications No.11-253811. The binuclear complex catalyzes the four-electron reduction of oxygen at a higher selectivity. It is described that a manganese atom changes it's valency from divalent to heptavalent and catalyzes the reaction of reducing oxygen in a potential range of –0.5V to +2V.

SUMMARY OF THE INVENTION

However, it is not known which type of catalyst is effective for the one-electron reduction of oxygen, the two-electron reduction or the four-electron reduction at what conditions. The selectivity of the four-electron reduction differs depending on the complex species, and it is difficult to know the content of a technology which is required for practical application, concerning which type of metal complex is suitable for stably obtaining a higher selectivity to the four-electron reduction. Further, according to technologies that have been disclosed, when a high potential is requested, a binuclear metal complex having a central metal atom having a large valency is required. Such binuclear metal complex has a strong oxidizing power, therefore when it is practically used, there is a problem that it causes the oxidation deterioration of the other constitutional elements such as an electrolyte liquid, an electrode lead, a collector, a battery case, a separator and a gas permeable selective membrane, which are used together with the binuclear metal complex in batteries or cells.

The present invention solves the problem and provides a composite electrode for reducing oxygen that provides a quasi four-electron reduction at selectivity of nearly 100% for the electrochemical reduction of oxygen without using a catalyst component such as a binuclear metal complex having a central metal atom having a large valency that has a strong oxidation power.

In order to solve the above-mentioned problems, the composite electrode for reducing oxygen of the present invention includes a composite electrode for reducing oxygen comprising an electrochemical catalyst A that produces hydrogen peroxide by two-electron reduction of oxygen and a catalyst B that decomposes the produced hydrogen peroxide to oxygen, wherein an electrode potential of the composite electrode is set at an oxygen reduction potential of the electrochemical catalyst A, and the oxygen regenerated from the produced hydrogen peroxide by the catalyst B is subjected to the two-electron reduction by the electrochemical catalyst A to produce hydrogen peroxide repeatedly.

Since the composite electrode of the present invention comprises an electrochemical catalyst A carrying out the two-electron reduction of oxygen which reduces one molecule of oxygen to produce one molecule of hydrogen peroxide and a catalyst B carrying out the decomposition of hydrogen peroxide which decomposes one molecule of produced hydrogen peroxide to regenerate one-half molecule of oxygen, the above-mentioned two-electron reduction and the above-mentioned decomposition reaction are carried out repeatedly. Consequently, a quasi four-electron reduction of oxygen is carried out at a selectivity of nearly 100%. That the quasi four-electron reduction of oxygen is carried out at a selectivity of nearly 100% means no other reduction current is observed except for that of the above quasi four-electron reduction of oxygen.

The electrochemical catalyst A may be a metal complex represented by $\alpha L_n$ (n is the number of ligands which coordinate the metal), which comprises a central metal atom $\alpha$ and a ligand L. The metal complex of the present invention refers to a mononuclear metal complex with the exception of specifying the metal complex. Since the mononuclear metal complex has a weaker oxidizing power compared with that of the above-mentioned binuclear metal complex, the oxidation deterioration of the constitutional elements in batteries or cells can be suppressed.

Further, the ligand of the metal complex may be a monodentate ligand or multidentate ligand, both of them containing nitrogen atom. Further, the ligand may have a porphyrin ring or phthalocyanine ring. Furthermore, the porphyrin ring or phthalocyanine ring can have at least one polymerizable functional group.

Further, the catalyst B may be a hydrogen peroxide decomposing enzyme or metal oxide represented by $\beta O_x$ ($\beta$ is a metal element, and x is the number of oxygen atom determined by the valency of the metal element).

Further, the metal oxide may be a perovskite oxide or manganese oxide represented by $MnO_y$ (y is the number of oxygen atom determined by the valency of manganese).

According to yet another aspect of the invention, there is provided a composite electrode for reducing oxygen comprising an electrochemical catalyst A described below and carrying out the two-electron reduction of oxygen which reduces one molecule of oxygen to produce one molecule of hydrogen peroxide, and a catalyst B described below and carrying out the decomposition of hydrogen peroxide which decomposes one molecule of produced hydrogen peroxide to regenerate one-half molecule of oxygen.

Further, the electrochemical catalyst A and the catalyst B may be supported on an electrically conductive substrate. Furthermore, the electrochemical catalyst A may serve as an electrically conductive substrate.

Further, the catalyst B may be electrically insulated so that electron does not transfer directly or through the electron conductive material between catalyst B and either or both of the electrically conductive substrate or the electrochemical catalyst A. Preferably, the catalyst B is dispersed in the proton-conductive polymer.

The electrochemical catalyst A may be selected from the group consisting of metal material, carbon material, metal oxide, and metal complex which is represented by $\alpha L n$ (n is the number of coordinating ligands) and includes a central metal atom $\alpha$ and a ligand L which coordinates to the said metal atom $\alpha$.

Further, the ligand of the metal complex may be one of a monodentate ligand and a multidentate ligand, both of them containing nitrogen atom. Further, the ligand may include porphyrin ring or phtalocyanine ring. Furthermore, the porhyrin ring or phtalocyanine ring may include at least one polymerizable substituent.

The catalyst B may be an enzyme decomposing hydrogen peroxide or metal oxide represented by $\beta O x$ ($\beta$ is a metal element, and x is the number of oxygen atom determined by the valency of the metal).

Further, the metal oxide may be one of a perovskite oxide and a manganese oxide represented by $MnOy$ (y is the number of oxygen atom determined by the valency of manganese). Furthermore, the perovskite oxide may be a $La_xSr_{1-x}MnO_3$ (x=0 to 0.5).

Preferably, the electrochemical catalyst A is a metal complex which is represented by $\alpha L n$ (n is the number of coordinating ligands) and includes a central metal atom $\alpha$ and a ligand L which coordinates to the said metal atom $\alpha$, and also the catalyst B is a metal oxide represented by $\beta O x$ ($\beta$ is a metal element, and x is the number of oxygen atom determined by the valency of the metal).

A power generation cell can be constructed by employing the composite electrode of the present invention as a positive electrode, which carries out the reduction of oxygen, for batteries or fuel cells.

That is, a power generation cell of the present invention includes a positive electrode described below, a negative electrode which carries out the oxidation reaction of an active material for the negative electrode active material or fuel material, and an electrolyte.

The positive electrode includes a composite electrode for reducing oxygen, said composite electrode comprising an electrochemical catalyst A that produces hydrogen peroxide by two-electron reduction of oxygen and a catalyst B that decomposes the produced hydrogen peroxide to oxygen, wherein an electrode potential of the composite electrode is set at an oxygen reduction potential of the electrochemical catalyst A, and wherein the oxygen regenerated from the produced hydrogen peroxide by the catalyst B is subjected to the two-electron reduction by the electrochemical catalyst A, thereby producing hydrogen peroxide repeatedly.

Further, the cell may generate electromotive force between the positive electrode and the negative electrode by imparting a molecule which electrochemically oxidizes a carbohydrate being excited by light, to the negative electrode and/or the electrolyte, supplying the carbohydrate while optically irradiating said molecule, and oxidizing the carbohydrate at the negative electrode by the molecule.

Further, the cell may be a fuel cell in which the positive electrode is an air electrode and the negative electrode is a fuel electrode, and the positive electrode and the fuel electrode are connected through a proton-conductive ion exchange membrane.

Further, the cell may be an air cell using a metal selected from the group consisting of zinc, magnesium and aluminum, for the negative electrode, thereby to construct a zinc-air cell, magnesium-air cell and aluminum-air cell.

BRIEF DESCRIPTION OF THE DRAWINGS

The above and other objectives and features of the present invention will become more apparent from the following description of preferred embodiments thereof with references to the accompanying drawings, throughout which like parts are designated by like reference numerals.

DETAILED DESCRIPTION OF THE PREFERRED EMBODIMENTS

The present disclosure relates to subject matter contained in application No.2001-259283 filed Aug. 29, 2001 in Japan, the content of which is incorporated hereinto by reference.

The present invention provides a composite electrode for reducing oxygen using oxygen as an electrode reaction substance. The composite electrode for reducing oxygen of the present invention contains at least an electrochemical catalyst A which produces hydrogen peroxide by electrochemical reduction of oxygen and a catalyst B which decomposes the produced hydrogen peroxide to oxygen. The electrochemical catalyst A catalyzes the two-electron reduction-(1) of oxygen that is represented by the formula;

$O_2+H_2O+2e^- \rightarrow OH^- +HO_2^-$ (in an alkali solution)

and produces hydrogen peroxide ($H_2O_2$, hydrogen peroxide ion represented by $HO_2^-$ in an alkali solution).

The catalyst B catalyzes the decomposition-(2) of oxygen which is represented by the formula;

$2HO_2^- \rightarrow O_2+2OH^-$ and regenerates oxygen. The regenerated oxygen is again subjected to the two-electron reduction-(1) by the electrochemical catalyst A, and hydrogen peroxide ion is produced. One molecule of oxygen produces one molecule of hydrogen peroxide by the two-electron reduction-(1) and one molecule of hydrogen peroxide regenerates one-half molecule of oxygen by the decomposition reaction-(2). One-half molecule of oxygen produces a one-half molecule of hydrogen peroxide by the two-electron reduction-(1), and a one-half molecule of the produced peroxide ion regenerates quarter molecule of oxygen by the decomposition reaction- (2). A quarter molecule of oxygen produces a quarter molecule of hydrogen peroxide by the two-electron reduction-(1) and a quarter molecule of the produced peroxide ion regenerates a eighth molecule of oxygen by the decomposition-(2). The two-electron reduction-(1) and the decomposition-(2) continue to occur repeatedly. Namely, the total four electrons of 2 electrons, one electron, one-half electron, quarter electron, eighth electron, ... (½) n electron (n→infinite) are used for the reduction of one molecule of oxygen, therefore one molecule of oxygen is equal to be subjected to the four-electron reduction at the potential of the two-electron reduction. Namely, although it is a two-electron reaction, it is the same result as the fact that there occurred a reaction equivalent to the four-electron reduction ($O_2 + 2H_2O + 4e^- \rightarrow 4OH^-$) which is 2-fold of the two-electron reaction.

Since the composite electrode for reducing oxygen of the present invention contains at least the electrochemical catalyst A which provides the reduction path of oxygen and the catalyst B, the four-electron reduction of oxygen can be carried out at a selectivity of nearly 100%.

The present invention is illustrated in detail below. As the electrochemical catalyst A of the present invention, any material among an organic material, an inorganic material, a metal, a mixture thereof and a complex thereof can be used so far as it electrochemically reduces oxygen to prepare hydrogen peroxide ($H_2O_2$, $HO_2^-$). There can be used metal materials such as platinum, cobalt, ruthenium, palladium, nickel, gold, silver, copper, a platinum-cobalt alloy or a platinum-ruthenium alloy; carbon materials such as graphite or active carbon; metal oxides such as copper oxide, nickel oxide, cobalt oxide, ruthenium oxide, lead oxide, molybdenum oxide, manganese dioxide, lead ruthenate or lanthanum-manganese-copper perovskite oxide; metal complexes such as metal phthalocyanines or metal porphyrins having a porphyrin ring such as iron phthalocyanine, cobalt phthalocyanine, copper phthalocyanine, manganese phthalocyanine, zinc phthalocyanine, ruthenium ammine complex, cobalt ammine complex, cobalt ethylenediamine complex or the like.

Among these, the metal complex represented by αLn which has a high activity for the electrochemical reduction of oxygen is preferably used. When the metal complex is used, there is an advantage that the reduction potential of oxygen can be changed to a noble direction (plus) or a less noble direction (minus) by not only changing the kind or valency of the central metal element α, but also changing the ligand L. For example, in the case of a cobalt phthalocyanine complex (represented as PcCo (II)) in which α is divalent cobalt, the two-electron reduction potential of oxygen can be changed to a noble direction (plus) by 10 to 50 mV by introducing an electron drawing carboxyl group (—COOH), a cyano group (—CN) and the like to the phthalocyanine ring.

Further, in the case of a zinc phthalocyanine complex (represented as PcZn (II)) in which α is divalent zinc and a copper phthalocyanine complex (represented as PcCu (II)) in which α is divalent copper, the two-electron reduction potential of oxygen can be changed to a less noble direction (minus) by 10 to 200 mV by introducing an electron donating alkoxy group such as an octabutoxy group (OBu) to the phthalocyanine ring. Furthermore, in the case of the metal complex which is constituted by a ligand having the capability of proton dissociation equilibrium, the two-electron reduction potential of oxygen can be changed between several hundreds mV by changing the pH of a medium such as an electrolyte solution in which the reduction of oxygen is carried out.

The ligand (L) is preferably a ligand having a porphyrin ring such as phthalocyanine, octabutoxyphthalocyanine, octacyanophthalocyanine, phthalocyanine tetra-acetate, tetra(o-aminophenyl)porphyrin, tetraaminophthalocyanine, tetramethylphenylporphyrin, tetraphenylporphyrin, or tetra (N-methoxyphenyl)porphyrin; and a mono-dentate or polydentate ligand which contains a nitrogen atom (N) and forms a complex with the central metal α through the nitrogen atom of ammonia, ethylene diamine, ethylene diamine tetra-acetate, 4-vinylpyridine, 2-vinylpyridine or bipyridyl because they form a comparatively stable metal complex. Specifically, the ligands such as tetraaminophthalocyanine or tetra(o-aminophenyl)porphyrin which have polymerizable functional groups including an amino group or an aminophenyl group are preferable because they can form a metal complex which is polymerized by polymerization and further increased stability.

As the central metal element(α) of the metal complex (αLn), platinum, ruthenium, cobalt, manganese, iron, copper, silver, zinc or the like is preferable because they can proceed the reduction of oxygen at a reduced overpotential. Further, the valency of α is preferably 4 or less. The oxidation power of the catalyst is suppressed by setting the valency as 4 or less, therefore the oxidation deterioration of the other constitutional elements such as an electrolyte liquid, an electrode lead, a collector, a battery case, a separator or a gas permeable selective membrane can be effectively prevented.

As the catalyst B of the present invention, any material among an organic material, an inorganic material, a metal, a mixture thereof and a complex thereof can be used which decompose hydrogen peroxide. Further, hydrogen peroxide decomposing enzymes such as catalase, and the like can be effectively used. Specifically, the metal oxide which has high affinity with hydrogen peroxide, has a high oxygen exchange capability of taking in and/or out oxygen, and is represented by $\beta O_x$ is preferable. As the metal oxide, there are manganese oxides ($MnO_y$) such as $Mn_2O_3$, $Mn_3O_4$, $Mn_5O_8$ or γ-MnOOH (a mixture of $Mn_3O_4$ and $Mn_5O_8$) which are obtained by chemically oxidizing a di-valent manganate such as $MnSO_4$ by hydrogen peroxide and if necessary, oxidizing it by heating in atmosphere containing oxygen gas; platinum-black; ruthenium oxide; perovskite oxides such as $Cu_{x-1}Sr_xTiO_3$ (x=0 to 0,5), $La_xSr_{1-x}MnO_3$ (x=0 to 0,5), $SrTiO_3$; or the like. Specifically, manganese lower oxide is preferable because the decomposition activity of hydrogen peroxide is high, deterioration is little, and it is cost-effective. The manganese lower oxide is a manganese oxide in which the atomic valency of manganese atom is less than 4. The positive electrode of manganese dioxide of a manganese dry cell after use can be used as it is, or a calcinated one can be used as a manganese lower oxide. This is also preferable from the viewpoint of the reuse of source materials.

The composite electrode for reducing oxygen of the present invention may include an electrically conductive substrate for holding the electrochemical catalyst A and the catalyst B thereon. The electrically conductive substrate may be made of a metal material, a carbon material and an electrically conductive oxide, and may be used in various shapes such as a plate, a bar, a cylinder, a disk or porous body. The electrically conductive substrate may serve as a current collector.

Further, the electrochemical catalyst A may serve as the electrically conductive substrate. In this case, the catalyst B must be held on the surface of the electrochemical catalyst A.

The electrode catalyst A and the catalyst B may be arranged being brought in contact with each other, or may be arranged separately in the composite electrode for reducing oxygen of the present invention. It is preferable to put them as close as possible. Thus, hydrogen peroxide which is prepared by the electrochemical reduction of oxygen in the electrochemical catalyst A reaches at the catalyst B without a transfer process or by the transfer of the shortest distance to regenerate oxygen, and the oxygen regenerated reaches at the electrochemical catalyst A without a transfer process or by the transfer of the shortest distance to be able to be subject to reduction. Further, when the metal complex is used as the electrode catalyst A, each molecule of the metal complex has an oxidation reduction capability, therefore the electrode catalyst A and the catalyst B can approach at molecular order, and the composite electrode for reducing oxygen having a reduced overpotential is obtained.

In order to supply electrons, which are required for the electrochemical reduction of oxygen, from the electrode which is used in combination with the composite electrode for reducing oxygen and carry out the electrochemical oxidation, the electrode catalyst A is hold on the electrically conductive substrate and is electrically connected with an electrode lead, a collector and/or an electroconductive body.

It is not necessary that the catalyst B is put in the composite electrode for reducing oxygen in a manner in which it is electrically connected with an electrode lead, a collector and/or an electroconductive body. It is preferable that it is put in a manner in which it is electrically insulated from them. Since the catalyst B is put in a manner in which it is electrically insulated, a material having both of the action of decomposing hydrogen peroxide to generate oxygen and the action of carrying out the electrochemical reduction of oxygen can be used as the catalyst B. Since the catalyst B is put in a manner in which it is electrically insulated, the electrochemical reaction does not occur, and only the decomposition of hydrogen peroxide to generate oxygen occurs.

Accordingly, the electrode potential of the complex electrochemical for reducing oxygen of the present invention is decided by only the reduction potential of oxygen at the electrode catalyst A, therefore the design of electrochemical devices using the aforementioned electrode becomes easy. Further, a material which is active for both of the reduction of oxygen and the decomposition of hydrogen peroxide in addition to the material previously shown can be also used as the catalyst B. As the catalyst B, there are platinum, gold, ruthenium, palladium, manganese dioxide, active carbon, graphite, metal porphyrin compounds and metal phthalocyanine compounds. Since an extra electrochemical reaction other than the reduction of oxygen does not occur, it can be effectively prevented that the hydrogen peroxide produced reacts with a species which is produced by an extra electrochemical reaction and is consumed, and that the regenerated oxygen reacts with species which is produced by an extra electrochemical reaction and is consumed. Accordingly, the four-electron reduction can be carried out at an apparent selectivity of nearly 100%.

There is no limitation to use the electrochemical catalyst A in combination with the catalyst B which decomposes hydrogen peroxide to produce oxygen so far as the electrochemical catalyst A reduces oxygen to produce hydrogen peroxide. However, when power-generating cells such as air cells or fuel cells are constructed by using the composite electrode for reducing oxygen of the present invention as a positive electrode and a negative electrode which supplies electrons to the positive electrode through an external circuit, the combination of the electrochemical catalyst A having the high selectivity of the reduction of oxygen and the catalyst B having the high selectivity of the decomposition of hydrogen peroxide can be preferably selected when an electrode active substance or a fuel substance used for the negative electrode is dissolved in an electrolyte and is brought in contact with the positive electrode. For a fuel cell which uses methanol, ethanol, ethylene glycol or saccharides such as glucose which are dissolved in the electrolyte, as a fuel, it is preferable that the metal phthalocyanine complex or metal porphyrin complex having the high selectivity of the reduction of oxygen is selected as the electrode catalyst A, the manganese lower oxides such as $Mn_2O_3$ or $Mn_5O_8$ which has a low oxidation power and the high decomposition capability of hydrogen peroxide, or catalase having the high selectivity for the decomposition of hydrogen peroxide is selected as the catalyst B.

When the composite electrode for reducing oxygen is prepared, the electrochemical catalyst A and the catalyst B can be hold on the electrically conductive substrate by various methods including a wet method, a dry method such as a vacuum deposition or a hot press method which presses a sheet-like catalyst layer containing a binder on the electrically conductive substrate in a heating condition. The wet method includes an application method which applies a coating liquid containing the electrochemical catalyst and/or catalyst on the electrically conductive substrate, or an electrochemical deposition method. In the application method, for example, a first catalyst layer can be formed by applying the coating liquid containing the electrochemical catalyst A on the surface of an electrically conductive substrate, and then a second catalyst layer can be formed by applying the coating liquid containing the catalyst B on the first catalyst layer. Therefore, the catalyst B is so arranged that the catalyst B does not contact directly with the electrically conductive substrate.

When the second catalyst layer is formed, a proton conductive polymer, for example, perfluoro sulfonic acid polymer can be contained in the coating liquid containing the catalyst B. The proton conductive polymer in the second catalyst layer can remove quickly the hydroxide ions produced by the decomposition of hydrogen peroxide by reacting the hydroxide ions with the protons of the proton conductive polymer, thereby to accelerate the decomposition of hydrogen peroxide.

Further, when the electrochemical catalyst A and/or the catalyst B are subjected to electrochemical deposition or electrolytic polymerization, the catalyst layer can be formed by depositing the electrochemical catalyst A and/or the catalyst B using the electrochemical method such as a potentiostatic method, a galvanostatic method or a potential sweep method. For example, when employing the metal complex having the ligands such as tetraaminophthalocyanine and tetra(o-aminophenyl)porphyrin which have polymerizable functional groups such as an amino group and an aminophenyl group as the electrochemical catalyst A, the catalyst layer containing the metal complex which is polymerized by electrolytic polymerization through the amino group can be obtained. The catalyst layer containing the catalyst B can be formed on the catalyst layer containing the macromolecular metal complex by the coating method or the electrochemical deposition method.

As the electrolyte used in combination with the composite electrode for reducing oxygen of the present invention, an electrolyte of either of an aqueous solution or an organic electrolyte liquid can be used. An alkaline aqueous solution having a low concentration of 1 M or less in which the solubility of oxygen is large and diffusion speed is fast is preferable in particular because it can effectively carry out the electrochemical reaction. The present invention is illustrated specifically below according to examples.

EXAMPLE 1

(1) Preparation of Test Electrodes 11,12, 13, 14 and 15

Poly-cobalt-4,4',4",4'''-tetraamino phthalocyanine (p-CoTAPc) as the electrochemical catalyst A and γ-MnOOH (a mixture of $Mn_3O_4$ and $Mn_5O_8$) as the catalyst B were used. Test electrodes were prepared using glassy carbon (GC) having a diameter of 6 mm. The glassy carbon was a pellet having a thickness of 5 mm and a diameter of 6 mm; the pellet was buried in a sheath made of a polyimide resin, which had a diameter of 10 mm and a length of 80 mm, in a manner that one surface was connected with an electrode lead and another surface was exposed. GC having exposed face on which none was formed was referred to as the test electrode 13.

To a dimethyl sulfoxide (DMSO) solution in which 0.1 M of tetrabutylammonium phosphate was dissolved, 0.2 mM of cobalt-4,4',4",4'''-tetraamino phthalocyanine (CoTAPc) which has the structural formula indicated in the formula (1) was dissolved to prepare an electrolyte solution. Electrolysis was carried out in the electrolyte solution using GC as a working electrode, platinum as a counter electrode and an Ag/AgCl (saturated KCl) electrode as a reference electrode, and p-CoTAPc was formed on the exposed surface of GC.

Electrolysis was repeatedly carried out by increasing and decreasing the potential of GC within plus 0.5 V to minus 1.4 V against the potential of the Ag/AgCl reference electrode at a rate of 50 mV/s by 30 cycles, and p-CoTAPc was formed on the GC. This was referred to as the test electrode 12. Wherein p-CoTAPc was formed by polymerizing CoTAPc through electrolytic oxidation of the amino groups of 4,4',4",4'''-positions of CoTAPc.

[Formula 1]

To 5 μl of an ethanol solution in which 0.05 wt % of a proton conductive perfluoro sulfonic acid polymer (Nafion 112: manufactured by Du Pont Co., Ltd.) was dissolved, 25 μg of γ-MnOOH powder was added and dispersed; the resultant solution was added dropwise so as to cover the whole face of the GC on which the afore-mentioned p-CoTAPc was formed; the GC was heated by warm wind to evaporate ethanol; the same solution was further added dropwise; ethanol was evaporated to obtain the test electrode 11.

Five (5) μl of the above-mentioned ethanol solution in which γ-MnOOH was dispersed was added dropwise so as to cover the whole face of the naked GC, ethanol was evaporated. This operation of adding the ethanol solution and evaporating ethanol was repeated twice to obtain the test electrode 14.

Five (5) μl of the above-mentioned ethanol solution in which γ-MnOOH was dispersed was added dropwise so as to cover the whole face of the naked gold (Au) electrode; ethanol was evaporated. This operation of adding the solution and evaporating ethanol was repeated twice to obtain the test electrode 15. The Au electrode used here was a pellet having a length of 5 mm and a diameter of 6 mm; the pellet was buried in a sheath made of a polyimide resin which has a diameter of 10 mm and a length of 80 mm in a manner one face connected with an electrode lead and another face was exposed.

(2) Evaluation of Oxygen Reduction Performance of Test Electrodes

The oxygen reduction performance of test electrodes were evaluated with a three-electrode cell which was constructed using the test electrodes which were prepared according to the above processes, as a working electrode, platinum as a counter electrode and an Ag/AgCl (saturated KCl) electrode as a reference electrode. A 0.1M phosphoric acid buffer having a pH of 7.4 was used as the electrolyte solution. After oxygen gas was passed through the electrolyte solution for 30 minutes and the dissolved oxygen was saturated, electrolysis was carried out. The potential of the working electrode was decreased from +0.1 V to -1.2 V at a speed of 50 mV/s against the reference electrode, and when it reached at -1.2 V, it was increased to 0 V at a speed of 50 mV/s. At this time, the electrolysis current which runs across the working electrode and the counter electrode was recorded against the potential of the working electrode.

Figure 1:
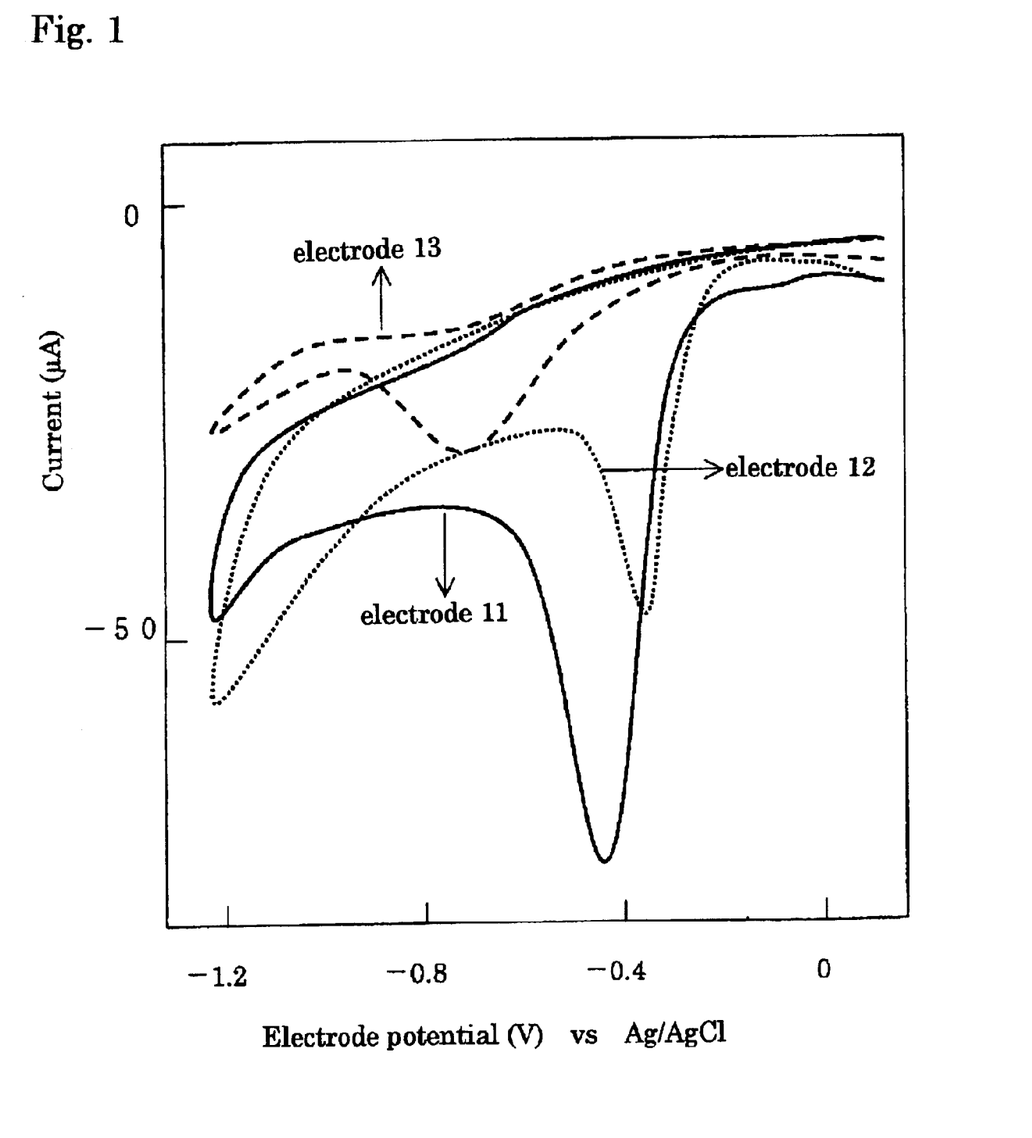
FIG. 1 is a drawing showing the current-potential curves of the electrode of the present invention.

FIG. 1 showed current-potential curves that were obtained with respect to the test electrodes 11, 12 and 13. In FIG. 1, the peak potential (Ep) of the reduction current which corresponds to the reduction of oxygen was -0.45 V at the test electrode 11, -0.35 V at the test electrode 12, and -0.75 V at the test electrode 13.

At the test electrode 11 or 12, since p-CoTAPc was formed on the GC, the reduction potential of oxygen shifts from -0.75 V to the plus side of -0.35 or -0.45 V. The reduction of oxygen was carried out at a nobler potential. The test electrode 11 of the present invention which complexed p-CoTAPc (the electrochemical catalyst A) and MnOOH (the catalyst B) provided about 2-fold of the peak current value of the reduction of oxygen in comparison with the test electrode 12 which uses only p-CoTAPc. There occurs repeatedly the reaction cycle in which hydrogen peroxide which was prepared by the two-electron reduction of oxygen by the action of p-CoTAPc is decomposed by the action of MnOOH to regenerate oxygen and the oxygen regenerated is reduced by p-CoTAPc, and since it corresponds to the 4-electron reduction, 2-fold of the peak current value was considered to be obtained. Namely, in the test electrode 11 according to the present invention, the electron reduction was proceeded at an efficiency of nearly 100% at a nobler potential.

Figure 2:
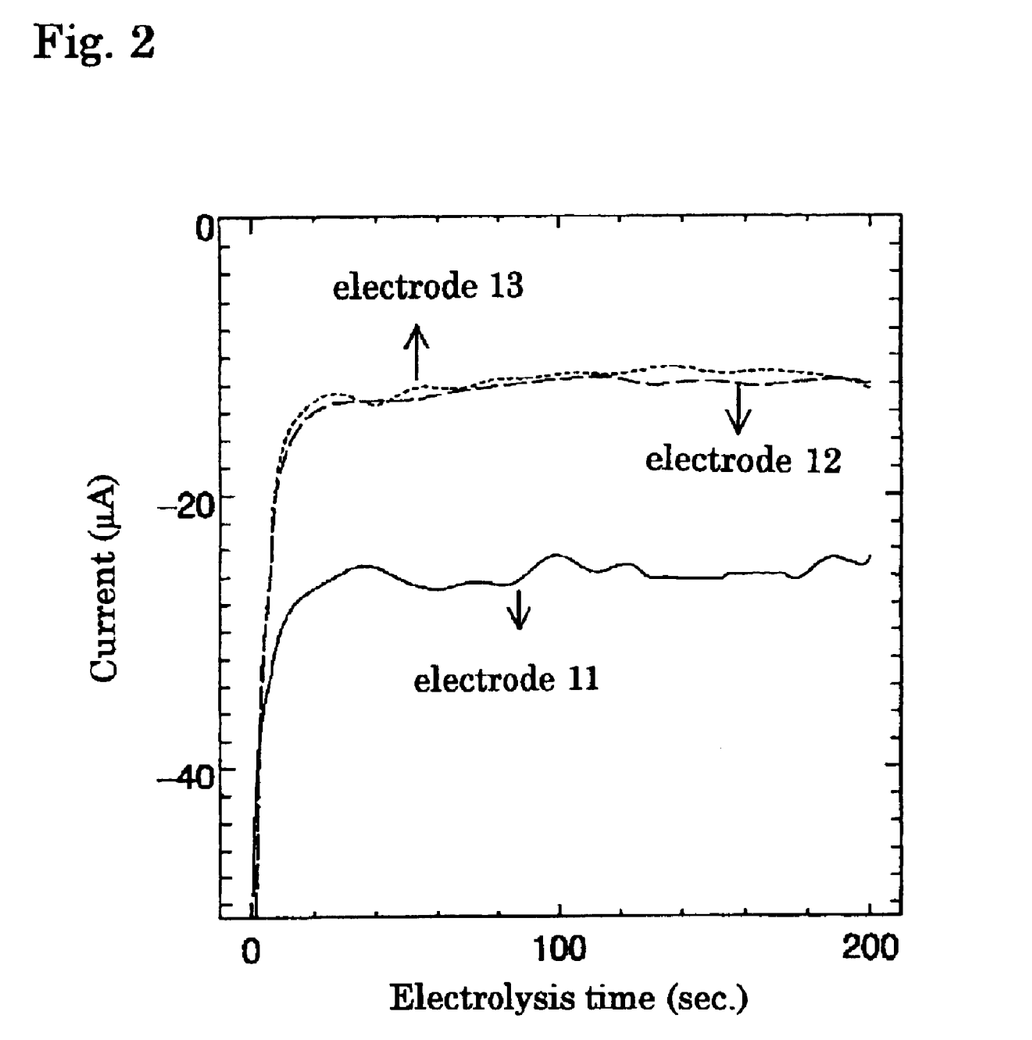
FIG. 2 is a drawing showing the current-time response of the electrode of the present invention at constant potential electrolysis.

FIG. 2 showed current-time curves when a constant potential electrolysis was carried out at the peak potential (Ep) with respect to each of the test electrodes 11, 12 and 13. The current reached a nearly constant value (Ist) for about 30 seconds after starting the electrolysis. The steady-state current (Ist) value is 12 to 13 μA for the test electrodes 12 and 13 of comparative examples, and 25 μA for the test electrode 11 of the present invention. The test electrode 11 provides about 2-fold of Ist value in comparison with the test electrodes 12 and 13, and oxygen was apparently reduced by the quasi four-electron reaction at an efficiency of nearly 100%.

The Ep value, the Ist value after 200 seconds and the Ist value after 120 hours at the constant potential electrolysis were given in Table 1 with respect to each of the test electrodes 11,12, 13, 14 and 15.

The constant potential electrolysis was carried out while bubbling an oxygen gas in the electrolyte solution.

TABLE 1

| Test electrode | Electrochemical catalyst A | Catalyst B | Peak potential of oxygen reduction current Ep (V) vs. Ag/AgCl | Constant current value at constant potential electrolysis at each peak potential | |
|---|---|---|---|---|---|
| | | | | Electrolysis after 200 sec. | Electrolysis after 120 hours |
| 11 | p-CoTAPc | MnOOH | −0.45 | 25 | 23 |
| 12 | p-CoTAPc | — | −0.35 | 13 | 12 |
| 13 | GC | — | −0.75 | 13 | — |
| 14 | GC | MnOOH | −0.75 | 18 | — |
| 15 | Au | MnOOH | −0.35 | 24 | — |
| 21 | CoTAPc | MnOOH | −0.40 | 26 | 15 |
| 22 | CoTAPc | — | −0.35 | 12 | 6 |
| 31 | CoHFPc | MnOOH | −0.20 | 15 | — |
| 32 | CoHFPc | — | −0.15 | 8 | — |
| 41 | CoCOOHPc | MnOOH | −0.15 | 20 | — |
| 42 | CoCOOHPc | — | −0.05 | 11 | — |
| 51 | CoBuPc | MnOOH | −0.35 | 28 | — |
| 52 | CoBuPc | — | −0.25 | 16 | — |
| 61 | p-CoTAPc | Catalase | −0.35 | 29 | — |
| 62 | CoHFPc | Catalase | −0.15 | 18 | — |
| 63 | CoCOOHPc | Catalase | −0.05 | 22 | — |
| 64 | CoOBuPc | Catalase | −0.25 | 30 | — |
| 65 | GC | Catalase | −0.75 | 22 | — |
| 66 | Au | Catalase | −0.35 | 26 | — |
| 71 | p-CoTAPc | $La_{0.8}Sr_{0.2}MnO_3$ | −0.40 | 27 | — |
| 72 | CoHFPc | $La_{0.8}Sr_{0.2}MnO_3$ | −0.15 | 16 | — |
| 73 | CoCOOHPc | $La_{0.8}Sr_{0.2}MnO_3$ | −0.10 | 20 | — |
| 74 | CoOBuPc | $La_{0.8}Sr_{0.2}MnO_3$ | −0.25 | 28 | — |
| 75 | GC | $La_{0.8}Sr_{0.2}MnO_3$ | −0.75 | 21 | — |
| 76 | Au | $La_{0.8}Sr_{0.2}MnO_3$ | −0.35 | 25 | — |

EXAMPLE 2

(3) Preparation of Test Electrodes 21 and 22

Test electrodes were prepared in the same manner as in the first example using cobalt-tetraamino phthalocyanine (CoTAPc) as the electrochemical catalyst A and γ-MnOOH (a mixture of $Mn_3O_4$ and $Mn_5O_8$) as the catalyst B and using glassy carbon (GC) having a diameter of 6 mm.

Five (5) μl of a solution in which 1 mM of CoTAPc was dissolved in N,N'-dimethylformamide (DMF) was added dropwise so as to cover the whole exposed face of the GC, and then, the GC was heated by warm wind for 2 hours to obtain the test electrode 22 which had CoTAPc on the GC surface. To 5 μl of an ethanol solution in which 0.05% by weight of Nafion was dissolved, 25 μg of γ-MnOOH powder was dispersed. The resultant solution was added dropwise so as to cover the whole face of the GC having CoTAPc; the GC was heated by warm wind to evaporate ethanol; 5 μl of the same ethanol solution was added dropwise, and ethanol was evaporated to obtain the test electrode 21 in accordance with the present invention which had CoTAPc and MnOOH on the GC surface.

(4) Evaluation of Oxygen Reduction Performance of Test Electrodes

The oxygen reduction performance of test electrodes were evaluated with a three-electrode cell which was constructed using the test electrodes which were prepared according to the above processes, as a working electrode, platinum as a counter electrode and an Ag/AgCl (saturated KCl) electrode as a reference electrode. A 0.1M phosphoric acid buffer having a pH of 7.4 was used as the electrolyte solution. After oxygen gas was passed through the electrolyte solution for 30 minutes and the dissolved oxygen was saturated, electrolysis was carried out. The potential of the working electrode was decreased from +0.1 V to −1.2 V at a speed of 50 mV/s against the reference electrode, and when it reached at −1.2 V, it was increased to 0 V at a speed of 50 mV/s. At this time, the electrolysis current which run across the working electrode and the counter electrode was recorded against the potential of the working electrode.

The test electrode 21 of the present invention which complexed CoTAPc (the electrochemical catalyst A) and MnOOH (the catalyst B) provided about 2-fold of the peak current value of the reduction of oxygen in comparison with the test electrode 22 which used only CoTAPc. The peak potential (Ep) of the reduction current which corresponds to the reduction of oxygen was shown in Table 1. It was −0.40 V at the test electrode 21, and −0.35 V at the test electrode 22. The reduction potential of oxygen shifted from −0.75 V to the plus side of −0.40 or −0.35 V, and the reduction of oxygen was proceeded at a nobler potential.

A constant potential electrolysis was continuously carried out at the peak potentials (Ep) with respect to each of the test electrodes 21 and 22. The Ist values after the constant potential electrolysis were shown in Table 1. The Ist value was 12 μ(after 200 seconds) and 6 μA (after 120 hours) for the test electrodes 22 of Comparative Example, and was 26 μA (after 200 seconds) and 15 μA (after 120 hours) for the test electrode 21 of the present invention. The test electrode 21 provides about 2-fold of the Ist value as compared with the test electrode 22, and oxygen was reduced by the quasi four-electron reaction at an efficiency of nearly 100%.

EXAMPLE 3

(5) Preparation of Test Electrodes 31 and 32

Test electrodes were prepared in the same manner as in the first example using cobalt-hexadecafluorophthalocyanine (CoHFPc) which has the structural formula indicated in the formula 2 as the electrochemical catalyst A and γ-MnOOH (a mixture of $Mn_3O_4$ and $Mn_5O_8$) as the catalyst B and using glassy carbon (GC) having a diameter of 6 mm.

[Formula 2]

Five (5) µl of a DMF solution in which 1 mM of CoHFPc was dissolved in N,N'-dimethylformamide (DMF) was added dropwise so as to cover the whole exposed face of the GC; the GC was heated by warm wind for 2 hours; further, 5 µl of the same DMF solution was added dropwise; the GC was heated by warm wind for 2 hours to obtain the test electrode 32 which had CoHFPc on the surface.

Five- (5) µl of a DMF solution in which 50 µg of γ-MnOOH powder was dispersed was added dropwise once so as to cover the whole face of the GC; the GC heated by warm wind for 2 hours. Further, the afore-mentioned DMF solution was added dropwise so as to cover the whole face of the GC which had CoHFPc; the GC was heated by warm wind to evaporate DMF to obtain the test electrode 31 in accordance with the present invention which had CoHFPc and MnOOH on the surface.

(6) Evaluation of Oxygen Reduction Performance of Test Electrodes

The oxygen reduction performance of test electrodes were evaluated with a three-electrode cell which was constructed using the test electrodes which were prepared according to the above processes, as a working electrode, platinum as a counter electrode and an Ag/AgCl (saturated KCl) electrode as a reference electrode. A 0.1 M phosphoric acid buffer having a pH of 7.4 was used as the electrolyte solution. After pure oxygen gas was passed through the electrolyte solution for 30 minutes and the dissolved oxygen was saturated, electrolysis was carried out. The potential of the working electrode was decreased from +0.1 V to −1.2 V at a speed of 50 mV/s against the reference electrode, and when it reached at −1.2 V, it was increased to 0 V at a speed of 50 mV/s. At this time, the electrolysis current which runs across the working electrode and the counter electrode was recorded against the potential of the working electrode.

The test electrode 31 of the present invention which complexed CoHFPc (the electrochemical catalyst A) and MnOOH (the catalyst B) provided about 2-fold of the peak current value of the reduction of oxygen in comparison with the test electrode 32 which used only CoHFPc. The peak potential (Ep) of the reduction current which corresponds to the reduction of oxygen was given in Table 1. It was −0.20 V at the test electrode 31 and −0.15 V at the test electrode 22. The reduction potential of oxygen shifts from −0.75 V to the plus side of −0.15 or −0.20 V The reduction of oxygen was proceeded at a nobler potential.

A constant potential electrolysis was continuously carried out at the peak potential (Ep) with respect to each of the test electrodes 31 and 32. The Ist values after 200 seconds of the constant potential electrolysis was given in Table 1. The Ist value was 8 µA for the test electrodes 22 of comparative example, and was 15 µA for the test electrode 31 of the present invention. The test electrode 31 provided about 2-fold of the Ist value in comparison with the test electrode 32, and oxygen was reduced by the quasi four-electron reaction at an efficiency of nearly 100%.

EXAMPLE 4

(7) Preparation of Test Electrodes 41 and 42

Test electrodes were prepared in the same manner as in the first example using cobalt-tetracarboxyphthalocyanine (CoCOOHPc) whose structural formula was indicated in the formula 3 as the electrochemical catalyst A and γ-MnOOH (a mixture of $Mn_3O_4$ and $Mn_5O_8$) as the catalyst B and using glassy carbon (GC) having a diameter of 6 mm.

[Formula 3]

Five (5) µl of a DMF solution in which 1 mM of CoCOOHPc was dissolved in N,N'-dimethylformamide (DMF) was added dropwise so as to cover the whole exposed face of the GC; the GC was heated by warm wind for 2 hours; further, 5 µl of the same DMF solution was added dropwise; the GC was heated by warm wind to prepare the test electrode 42 which had CoCOOHPc on the surface.

Five (5) µl of a solution in which 50 µg of γ-MnOOH powder was dispersed in the afore-mentioned DMF solution containing CoCOOHPc was added dropwise so as to cover the whole face of the GC having CoCOOHPc which was prepared by adding dropwise 5 µl of the afore-mentioned DMF solution containing CoCOOHPc once and drying it by warm wind for 2 hours; the GC was heated by warm wind to evaporate DMF to obtain the test electrode 41 in accordance with the present invention which had CoCOOHPc and MnOOH on the surface.

(8) Evaluation of Oxygen Reduction Performance of Test Electrodes

The oxygen reduction performance of test electrodes were evaluated with a three-electrode cell which was constructed using the test electrodes which were prepared according to the above processes, as a working electrode, platinum as a counter electrode and an Ag/AgCl (saturated KCl) electrode as a reference electrode. A 0.1 M phosphoric acid buffer having a pH of 7.4 was used as the electrolyte solution. After an oxygen gas was passed through the electrolyte solution for 30 minutes and the dissolved oxygen was saturated, electrolysis was carried out. The potential of the working electrode was decreased from +0.1 V to −1.2 V at a speed of 50 mV/s against the reference electrode, and when it reached at −1.2 V, it was increased to 0 V at a speed of 50 mV/s. At this time, the electrolysis current which runs across the working electrode and the counter electrode was recorded against the potential of the working electrode.

The test electrode 41 of the present invention which complexed CoCOOHPc (the electrochemical catalyst A) and MnOOH (the catalyst B) provided about 2-fold of the peak current value of the reduction of oxygen as compared with the test electrode 42 which used only CoCOOHPc. The peak potential (Ep) of the reduction current was given in Table 1. It was −0.15 V at the test electrode 41 and −0.05 V at the test electrode 42. The reduction potential of oxygen shifted from −0.75 V to the plus side of −0.05 or −0.15 V The reduction of oxygen was proceeded at a nobler potential.

A constant potential electrolysis was continuously carried out at the peak potentials (Ep) with respect to each of the test electrodes 41 and 42. The Ist values after 200 seconds of the constant potential electrolysis were given in Table 1. The Ist value was 11 μA for the test electrodes 42 of comparative example and was 20 μA for the test electrode 41 of the present invention. The test electrode 41 provided about 2-fold of the Ist value as compared with the test electrode 42. Oxygen was reduced by the quasi four-electron reaction at an efficiency of nearly 100%.

EXAMPLE 5

(9) Preparation of Test Electrodes 51 and 52

Test electrodes were prepared in the same manner as in the first example using cobalt-octabutoxyphthalocyanine (CoOBuPc) whose structural formula was indicated in the formula 4 as the electrochemical catalyst A and γ-MnOOH (a mixture of $Mn_3O_4$ and $Mn_5O_8$) as the catalyst B and using glassy carbon (GC) having a diameter of 6 mm.

[Formula 4]

One (1) mM of CoOBuPc was dissolved in N,N'-dimethylformamide (DMF) which dissolved 0.05% by weight of an oxygen permeable poly (4-vinyl pyridine). Five (5) μl of the DMF solution was added dropwise so as to cover the whole exposed face of the GC; the GC was heated by warm wind for 2 hours; 5 μl of the same DMF solution was added dropwise; the GC was dried again by warm wind for 2 hours to prepare the test electrode 52 which had CoOBuPc on the surface. Five (5) μl of a solution in which 50 μg of γ-MnOOH powder was dispersed in the forementioned DMF solution was added dropwise so as to cover the whole exposed face of the GC; the GC was heated by warm wind for 2 hours; 5 μl of the same solution was added dropwise; the GC was heated by warm wind to evaporate DMF to obtain the test electrode 51 in accordance with the present invention which had CoOBuPc and MnOOH on the GC surface.

(10) Evaluation of Oxygen Reduction Performance of Test Electrodes

The oxygen reduction performance of test electrodes were evaluated with a three-electrode cell which was constructed using the test electrodes which were prepared according to the above processes, as a working electrode, platinum as a counter electrode and an Ag/AgCl (saturated KCl) electrode as a reference electrode. A 0.1 M phosphoric acid buffer having a pH of 7.4 was used as the electrolyte solution. After pure oxygen gas was passed through the electrolyte solution for 30 minutes and the dissolved oxygen was saturated, electrolysis was carried out. The potential of the working electrode was decreased from +0.1 V to −1.2 V at a speed of 50 mV/s against the reference electrode, and when it reached at −1.2V, it was increased to 0 V at a speed of 50 mV/s. At this time, the electrolysis current which run across the working electrode and counter electrode was recorded against the potential of the working electrode.

The test electrode 51 of the present invention which complexed CoOBuPc (the electrochemical catalyst A) and MnOOH (the catalyst B) provided about 2-fold of the peak current value of the reduction of oxygen in comparison with the test electrode 52 which used only CoCOOHPc. The peak potential (Ep) of the reduction current which corresponded to the reduction of oxygen was given in Table 1. It was −0.35 V at the test electrode 51, and −0.25 V at the test electrode 42. The reduction potential of oxygen shifted from −0.75 V to the plus side of −0.35 or −0.25 V. The reduction of oxygen was proceeded at a nobler potential.

A constant potential electrolysis was continuously carried out at the peak potentials (Ep) with respect to each of the test electrodes 51 and 52. The Ist values after 200 seconds of the constant potential electrolysis were given in Table 1. The Ist value was 16 μA for the test electrodes 52 of Comparative Example and was 28 μA for the test electrode 51 of the present invention. The test electrode 51 provided about 2-fold of the Ist value in comparison with the test electrode 52. Oxygen was reduced by the quasi four-electron reaction at an efficiency of nearly 100%.

EXAMPLE 6

(11) Preparation of Test Electrodes 61, 62, 63, 64, 65 and 66

Test electrodes were prepared in the same manner as in the first example using CoTAPc, CoHFPc, CoCOOHPc and CoOBuPc as the electrochemical catalyst A and catalase which is an enzyme decomposing hydrogen peroxide as the catalyst B and using glassy carbon (GC) having a diameter of 6 mm.

Test electrodes 61, 62, 63 and 64 were prepared by the same method as the preparation method of the test electrodes 21, 31, 41 and 51 except that catalase was used in place of MnOOH.

Test electrode 65 was prepared by the same method as the preparation method of the test electrode 14 except that catalase was used in place of MnOOH.

Test electrode 66 was prepared by the same method as the preparation method of the test electrode 15 except that catalase was used in place of MnOOH.

(12) Evaluation of Oxygen Reduction Performance of Test Electrodes

The oxygen reduction performance of test electrodes were evaluated with a three-electrode cell which was constructed using the test electrodes which were prepared according to the above processes, as a working electrode, platinum as a counter electrode and an Ag/AgCl (saturated KCl) electrode as a reference electrode. A 0.1 M phosphoric acid buffer having a pH of 7.4 was used as the electrolyte solution. After oxygen gas was passed through the electrolyte solution for 30 minutes and the dissolved oxygen was saturated, electrolysis was started. The potential of the working electrode was decreased from +0.1 V to −1.2 V at a speed of 50 mV/s against the reference electrode, and when it reached at −1.2 V, it was increased to 0 V at a speed of 50 mV/s. At this time, the electrolysis current which runs across the working electrode and the counter electrode was recorded against the potential of the working electrode.

The test electrodes 1, 62, 63 and 64 of the present invention which complexed the electrochemical catalyst A and catalyst B provided about 2-fold of the peak current value of the reduction of oxygen in comparison with the test electrode 22, 32, 42 and 52 which did not contain the catalyst B. The peak potential (Ep) of the reduction current which corresponded to the reduction of oxygen was given in Table 1. The reduction potential of oxygen shifted from −0.75 V to the plus side of −0.35 or −0.05 V. The reduction of oxygen was proceeded at a nobler potential.

A constant potential electrolysis was continuously carried out at the peak potentials (Ep) with respect to each of the test electrodes 61, 62, 63, 64, 65 and 66. The Ist value after 200 seconds of the constant potential electrolysis was given in Table 1. The Ist value is 18 to 30 $\mu A$ for the test electrode 61, 62, 63, 64, 65 and 66 in accordance with the present invention. They provide about 2-fold of the stationary current value in comparison with the test electrodes 22, 32, 42 and 52 which do not contain the catalyst B, and oxygen is apparently reduced by the four-electron reaction at an efficiency of nearly 100%.

EXAMPLE 7

(13) Preparation of Test Electrodes 71, 72, 73, 74, 75 and 76

Test electrodes were prepared in the same manner as in the first example using CoTAPc, CoHFPc, CoCOOHPc and CoOBuPc as the electrochemical catalyst A and perovskite oxide $La_{0.8}Sr_{0.2}MnO_3$ as the catalyst B and using glassy carbon (GC) having a diameter of 6 mm.

Test electrodes 71, 72, 73 and 74 were prepared by the same method as the preparation method of the test electrodes 21, 31, 41 and 51 except that $La_{0.8}Sr_{0.2}MnO_3$ was used in place of MnOOH.

Test electrode 75 was prepared by the same method as the preparation method of the test electrode 14 except that $La_{0.8}Sr_{0.2}MnO_3$ was used in place of MnOOH.

Test electrode 76 was prepared by the same method as the preparation method of the test electrode 15 except that $La_{0.8}Sr_{0.2}MnO_3$ was used in place of MnOOH.

(14) Evaluation of Oxygen Reduction Performance of Test Electrodes

The oxygen reduction performance of test electrodes were evaluated with a three-electrode cell which was constructed using the test electrodes which were prepared according to the above processes, as a working electrode, platinum as a counter electrode and an Ag/AgCl (saturated KCl) electrode as a reference electrode. A 0.1 M phosphoric acid buffer having a pH of 7.4 was used as the electrolyte solution. After oxygen gas was passed through the electrolyte solution for 30 minutes and the dissolved oxygen was saturated, electrolysis was started. The potential of the working electrode was decreased from +0.1 V to −1.2 V at a speed of 50 mV/s against the reference electrode, and when it reached at −1.2 V, it was increased to 0 V at a speed of 50 mV/s. At this time, the electrolysis current which run across the working electrode and the counter electrode was recorded against the potential of the working electrode.

The test electrodes 71, 72, 73, 74, 75 and 76, which were the composite electrodes of the present invention containing the electrochemical catalyst A and the catalyst B, provided about 2-fold of the peak current value of the reduction of oxygen in comparison with the test electrode 22, 32, 42 and 52 which did not contain the catalyst B. The peak potential (Ep) of the reduction current which corresponds to the reduction of oxygen was given in Table 1. The reduction potential of oxygen shifted from −0.75 V to the plus side of −0.40 or −0.10 V The reduction of oxygen was proceeded at a nobler potential.

A constant potential electrolysis was continuously carried out at the peak potentials (Ep) with respect to each of the test electrodes 71, 72, 73, 74, 75 and 76. The Ist values after 200 seconds of the constant potential electrolysis were given in Table 1. The Ist value was 16 to 28 $\mu A$ for the test electrode 71, 72, 73, 74, 75 and 76 in accordance with the present invention. They provided about 2-fold of the Ist value in comparison with the test electrodes 22, 32, 42 and 52 which did not contain the catalyst B. Oxygen was apparently reduced by the quasi four-electron reaction at an efficiency of nearly 100%.

Test electrodes which corresponded to the test electrodes 71 to 74 were prepared by partially or wholly replacing the central metal cobalt (Co) by iron (Fe) or manganese (Mn). Almost the same effect as the test electrodes using a metal complex whose central metal was cobalt (Co) was obtained. Namely, the reduction potential of oxygen shifted to noble (plus), about 2-fold of a peak current value and Ist value were obtained.

EXAMPLE 8

(15) Assembly of Power Generating Cells

Figure 3:
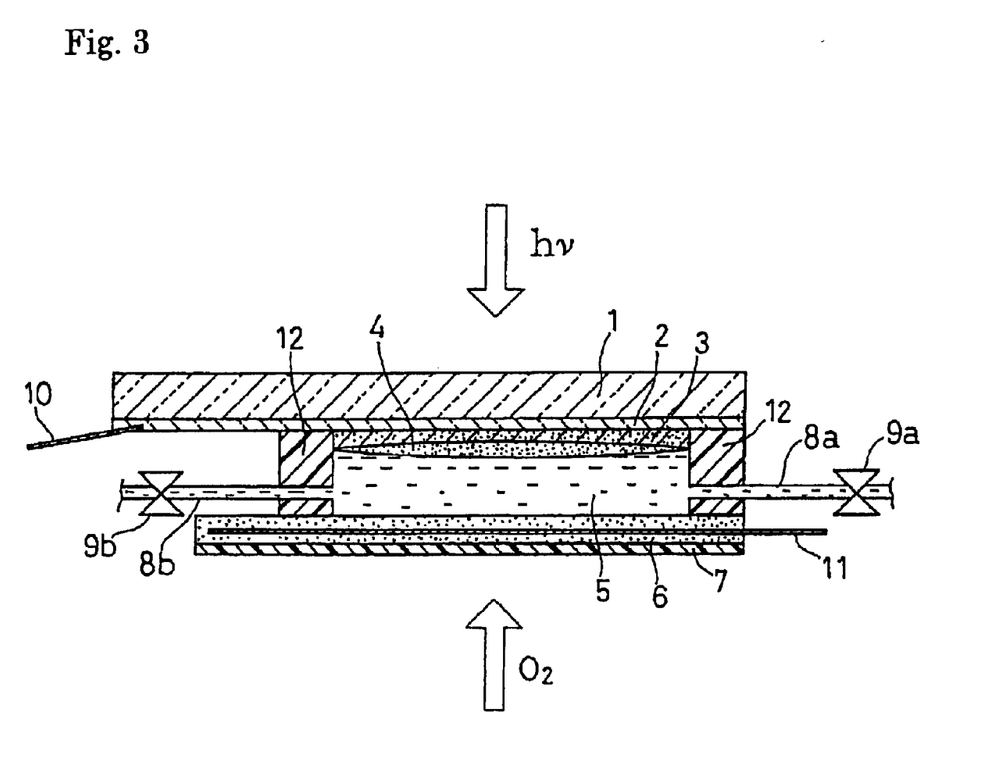
FIG. 3 is a schematic sectional view of a power-generating cell of one example of the present invention.

A power generating cell A and a power generating cell B which have the cross-sectional structure shown in FIG. 3 were assembled. The air electrode (6) was prepared for the power generating cell A by burying in a nickel screen having a thickness of 0.2 mm a mixture which contained 2 parts by weight of $Mn_2O_3$ powder on which 2.0% by weight of cobalt tetracarboxyphthalocyanine (CoCOOHPc) whose structural formula was shown in the Formula 3 was loaded, 1 part by weight of active carbon powder, 0.3 part by weight of acetylene black powder, and 0.2 part by weight of a polytetrafluoroethylene (PTFE) binder.

The photo catalyst electrode which worked as a negative electrode consisted of a glass substrate (1), an ITO thin film (2), a $TiO_2$ fine particle film, and a dye molecule. A transparent electro-conductive substrate had an indium-tin oxide (ITO) thin film (2) having the surface resistance of 10 ohm/□ formed on the glass substrate (1) having a thickness of 1 mm. An acetonitrile solution which contained 30 wt % of a polyethylene glycol in which 11 wt % of $TiO_2$ particle having an average diameter of 10 nm was coated on the ITO thin film by an immersion method. After drying the coating at 80° C., it was heated at 400° C. in air for one hour to form the $TiO_2$ fine particle film (3) having a thickness of about 10 $\mu m$. Then, the dye molecule was adhered on the $TiO_2$ fine particle film by immersing the $ThO_2$ fine particle film in an ethanol solution which dissolved 10 mM of the ruthenium metal complex dye molecule whose structure was given in the Formula 5. Further, after the $TiO_2$ fine particle film was immersed in 4-tert-butylpyridine, it was rinsed with acetonitrile and dried to obtain the photo catalyst electrode. The sealant (12) was made from a transparent silicone rubber.

[Formula 5]

To a 0.1 M KOH aqueous solution, a solution in which 50 mM of glucose and 5 mM of NADH were dissolved was added to obtain the electrolyte-fuel liquid (5). The electrolyte-fuel liquid (5) was injected from the injection nozzle of the electrolyte-fuel liquid (8a), and discharged from the discharge nozzle (8b) after generating power. Air is supplied in the inside of the power generating cell from the outside atmosphere through the oxygen permeable water repellant membrane (7).

The power generating cell B was prepared so as to have the same constitution as the power generating cell A except that an air electrode of $Mn_2O_3$ free of CoCOOHPc was used.

The photo catalyst electrode generates a photoactive species ($S^+$) and electrons by photo irradiation. The $S^+$ receives electrons from NADH (a reduced body), and returns to the original ground state species (S). The NADH which delivered electrons becomes an oxidized body ($NADH^+$), and the $NADH^+$ oxidizes glucose ($C_6H_{12}O_6$), receives electrons from glucose and returns to NADH. The electron which is generated at the photo catalyst electrode passes through an external circuit to reach at the oxygen electrode which serves as a positive electrode, and used for the reduction of oxygen ($O_2$). The above power generating reaction is given by the reaction formulae below.

(Negative Electrode)

$S \rightarrow S^+ + e^-$ (to external circuit)

$NADH + S^+ \rightarrow NAD^+ + S$ $NAD^+ + C_6H_{12}O_6 \rightarrow NADH + C_6H_{11}O_6 + H^+$ (to positive electrode)

(Positive Electrode)

$\tfrac{1}{2}O_2 + e^-$ (from external circuit) $+ H^+$ (from negative electrode) $\rightarrow \tfrac{1}{2}H_2O$ (Whole Reaction)

$C_6H_{12}O_6 + \tfrac{1}{2}O_2 \rightarrow C_6H_{11}O_6 + 1/2 H_2O$ (16) Operating Characteristic of Power Generation Cells After a power generation cell prepared by the above-mentioned steps was filled with the electrolyte-fuel liquid, light from a solar light simulator (AM1.5, 100 mW/cm$^2$) was irradiated from the glass substrate (1) side, and the electromotive force (OCV) and the voltage of the power generating cell were measured when the cell was discharged at a constant current of 100 μA for 20 minutes. The OCV was 1.30 V for the power generating cell A and 1.20 V for the power generating cell B. Further, the voltage of the power generating cell after discharge for 20 minutes was 1.20 V for the power generating cell A and 1.0 V for the power generating cell B.

The power generating cell A having the composite electrode for reducing oxygen of the present invention provided a high electromotive force in comparison with the power generating cell B, and a high voltage was kept on discharge.

EXAMPLE 9

(Fuel Cell)

The composite electrode of reducing oxygen of the present invention is used as an air electrode, a negative electrode is used as a fuel electrode. A fuel cell is constructed by connecting the air electrode and the fuel electrode through a proton conductive ion exchange membrane.

Figure 4:
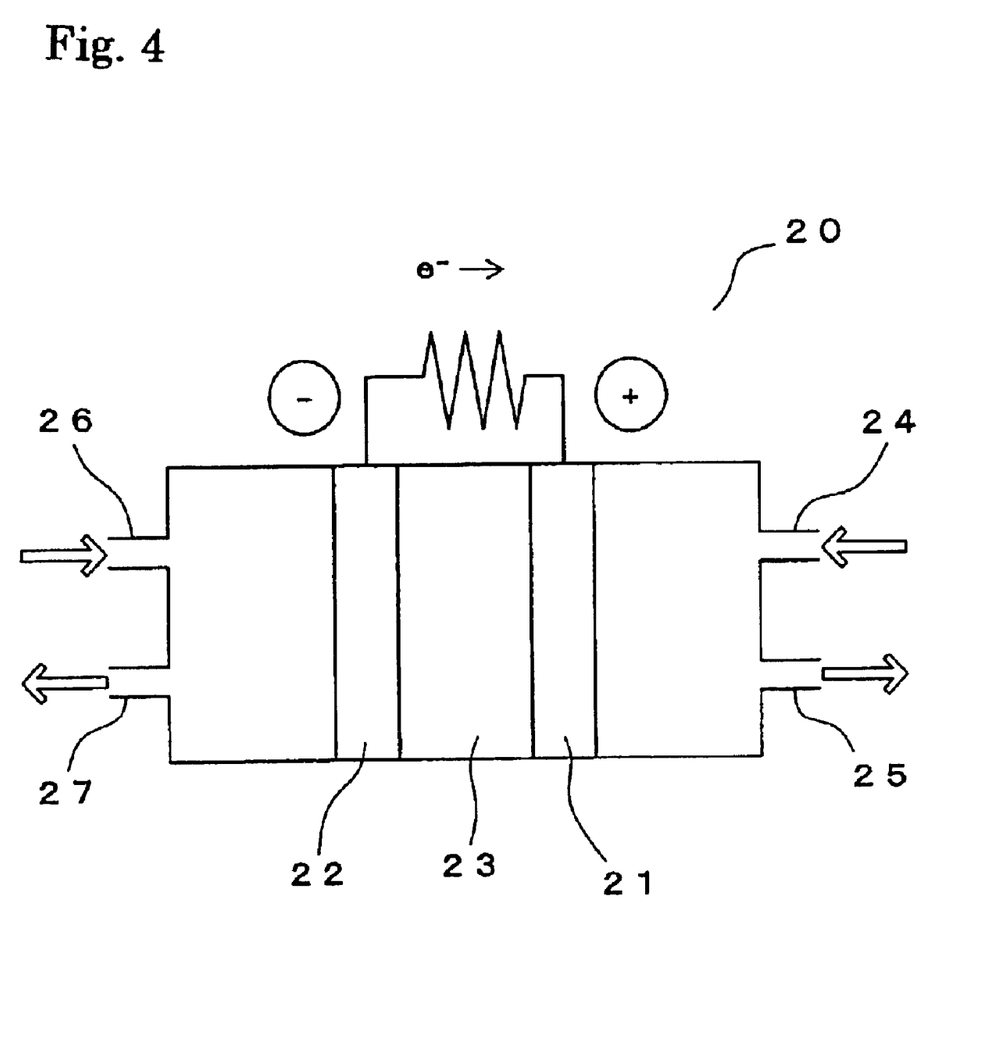
FIG. 4 is a schematic view of a fuel cell of one example of the present invention.

FIG. 4 is a schematic view of the fuel cell of one example of the present invention. A unit cell 20 of the fuel cell includes the air electrode 21 and the fuel electrode 22, which are connected through the proton conductive ion exchange membrane 23. Air is supplied into the air electrode 21 from the air inlet 24, and is discharged from the air outlet 25 after reaction. The fuel gas containing hydrogen is supplied into the fuel electrode 22 from the fuel inlet 26, and is discharged from the fuel outlet 27 after reaction. The above power generation reaction is shown by the reaction formula below.

(Negative Electrode)

$H_2 \rightarrow 2 H^+ + 2e^-$ (to external circuit)

(Positive Electrode)

$\tfrac{1}{2}O_2 + 2H^+ + e^-$ (from external circuit) $\rightarrow H_2O$

A sheet type air electrode which is prepared by kneading a mixture which includes 2 parts by weight of $Mn_2O_3$ powder on which 2.0% by weight of cobalt tetracarboxyphthalocyanine (CoCOOHPc) whose structural formula was shown in the Formula 3 is loaded, 1 part by weight of active carbon powder, 0.3 part by weight of acetylene black powder, and 0.2 part by weight of a polytetrafluoroethylene (PTFE) binder and rolling the kneaded mixture into the air electrode.

A sheet type fuel electrode which is prepared by admixing a PTTFE binder to carbon particles on which a given amount of platinum is supported, kneading the mixture and rolling it into the fuel electrode. Then, for example, a single cell is prepared by clamping the sheet type air electrode and the sheet type fuel electrode on both faces of the proton conductive ion exchange membrane such as Nafion 112. Alternatively, a liquid ion exchange membrane is coated on the one side face of an air electrode and a fuel electrode, they are dried to be solidified, and then the air electrode and the fuel electrode were clamped through the solidified ion exchange membrane. Further, a stack can be also constructed by piling up a plural number of single cells which were prepared by the above-mentioned methods.

A fuel cell having a high electromotive force and a high cell voltage on discharge in comparison with a conventional cell can be obtained by using the composite electrode of reducing oxygen of the present invention.

EXAMPLE 10

(Air Cell)

An air cell was constructed by using the composite electrode of reducing oxygen of the present invention as a positive electrode and metals such as zinc, magnesium and aluminum as a negative electrode.

The air zinc cell using zinc as a negative electrode was prepared by the method below.

Figure 5:
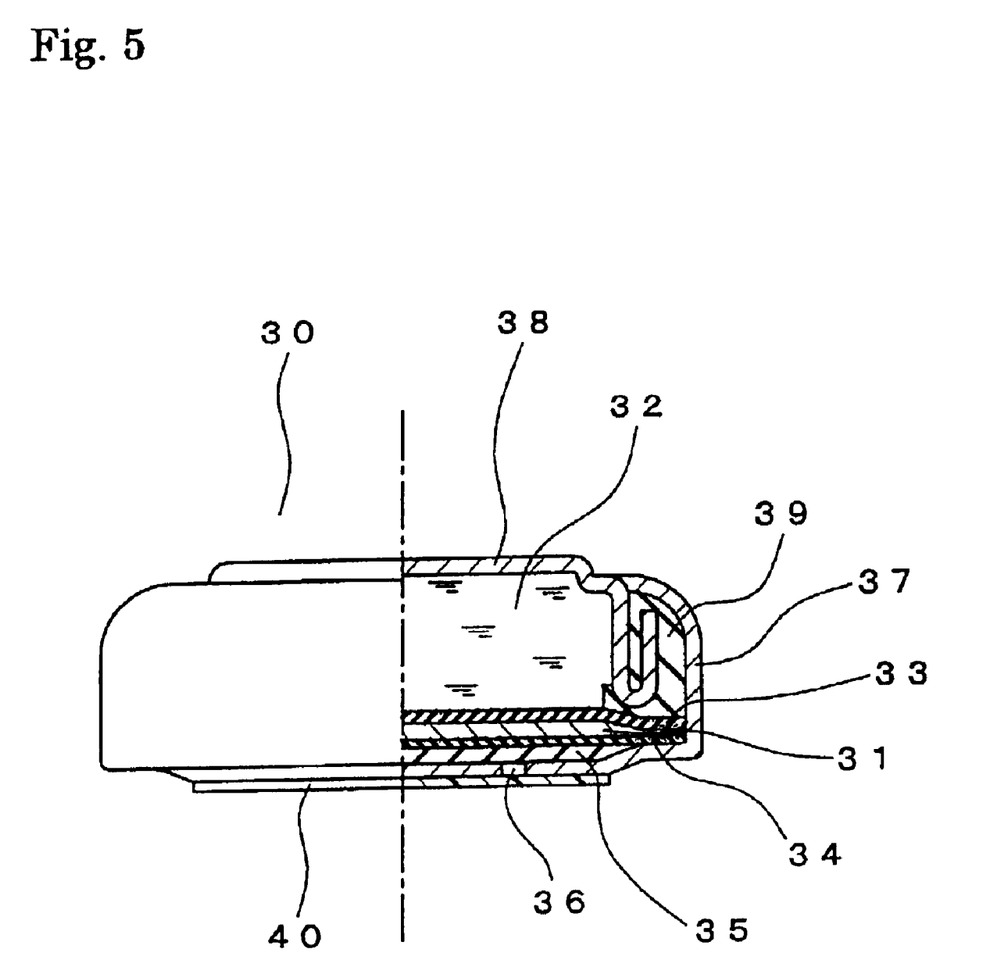
FIG. 5 is a partially cutaway schematic view of an air cell of one example of the present invention.

FIG. 5 is a partially cutaway schematic view of the air cell of one example of the present invention. An oxygen permeable membrane 35, a water repellent film 34, an air electrode 31, and a separator 33 were stuck in this order on an positive electrode case 37 made of a metal having air inlet holes 36 at the bottom. A negative electrode 32 containing a zinc powder, a gelating agent and an alkali electrolyte liquid was put in the negative electrode case 38 made of a metal. Then, the positive electrode case 37 was capped with the negative electrode case 38 and was sealed through an insulation gasket 39. An adhesive seal 40 sealed the air inlet holes 36. The water-repellent film 34 had the functions of supplying oxygen to the air electrode and inhibiting the electrolyte liquid from leaking out of the cell. The above power generation reaction is shown by the reaction formula below.

(Negative Electrode)

$Zn + 2OH^- \rightarrow Zn(OH)_2 + 2e^-$ (to external circuit)

(Positive Electrode)

$\frac{1}{2}O_2 + H_2O + 2e^-$ (from external circuit) $\rightarrow 2OH^-$

An electrode which was prepared by burying in a nickel screen having a thickness of 0.2 mm a mixture which contained 2 parts by weight of $Mn_2O_3$ powder on which 2.0% by weight of cobalt tetracarboxyphthalocyanine (CoCOOHPc) whose structural formula was shown in the Formula 3 was loaded, 1 part by weight of active carbon powder, 0.3 part by weight of acetylene black powder, and 0.2 part by weight of a polytetrafluoroethylene (PTFE) binder was used as an air electrode which served as an positive electrode.

A water-repellent film, an air electrode, and a separator were put in a positive electrode case made of a metal having air inlet holes at the bottom. A negative electrode containing a zinc powder as a negative electrode active substance, a gelating agent and an alkali electrolyte liquid was put in the negative electrode case made of a metal. The positive electrode case was capped with the negative electrode case through an insulation gasket and was tightly sealed. The water-repellent film worked to supply oxygen to the air electrode and prevent the leak of the electrolyte liquid to the outside of the cell. If necessary, an air diffusion paper for uniformly dispersing air can be inserted between the bottom face of the positive electrode case and the water-repellent film.

An air cell having an electromotive force and a cell voltage on discharge higher by about 0.1 V to 0.5 V in comparison with a conventional cell was obtained by using the composite electrode for reducing oxygen of the present invention as the positive electrode.

While zinc was employed as the negative electrode in the example 10, air cells employing magnesium or aluminum instead of zinc as the negative electrode can be constructed in the same manner with the example 10 and provide the same effects with that of example 10.

According to the present invention, there is provided the composite electrode of reducing oxygen which provides the quasi four-electron reduction at a selectivity of nearly 100% against the electrochemical reduction of oxygen. The electrode is excellent in stability and is used for the oxygen electrode or air electrode of an electrochemical device including air cells such as a zinc-air cell, an aluminum-air cell or a sugar-air cell, and fuel cells such as an oxygen-hydrogen fuel cell or a methanol fuel cell, where the reduction of oxygen is used as an positive electrode reaction.

Although the present invention has been fully described by way of examples with references to the accompanying drawings, it is to be noted here that various changes and modifications will be apparent to those skilled in the art.

Therefore, unless such changes and modifications otherwise depart from the spirit and scope of the present invention, they should be constructed as being included therein.

What is claimed is:

1. A composite electrode for reducing oxygen comprising an electrochemical catalyst A that produces hydrogen peroxide by two-electron reduction of oxygen and a catalyst B that decomposes the produced hydrogen peroxide to oxygen, wherein an electrode potential of the composite electrode is set at an oxygen reduction potential of the electrochemical catalyst A, and the oxygen regenerated from the produced hydrogen peroxide by the catalyst B is subjected to the two-electron reduction by the electrochemical catalyst A to produce hydrogen peroxide repeatedly, and wherein the electrochemical catalyst A and the catalyst B are supported on an electrically conductive substrate, the catalyst B being electrically insulated so that electrons do not transfer directly or through the electron conductive material between catalyst B and either or both of the electrically conductive substrate or the electrochemical catalyst A.

2. The composite electrode according to claim 1, wherein the electrochemical catalyst A is a metal complex represented by $\alpha L_n$ (n is the number of ligands which coordinate the metal), which comprises a central metal atom $\alpha$ and a ligand L.

3. The composite electrode according to claim 2, wherein the ligand is a monodentate ligand or multidentate ligand, both of them containing nitrogen atom.

4. The composite electrode according to claim 3, wherein the ligand has a porphyrin ring or phthalocyanine ring.

5. The composite electrode according to claim 4, wherein the porphyrin ring or phthalocyanine ring has at least one polymerizable functional group.

6. The composite electrode according to claim 1, wherein the catalyst B is a hydrogen peroxide decomposing enzyme or oxide represented by $\beta O_x$ ($\epsilon$ is a metal element, and x is the number of oxygen atoms determined by the valency of the metal element).

7. The composite electrode according to claim 6, wherein the metal oxide is a perovskite oxide or manganese oxide represented by $MnO_y$ (y is the number of oxygen atoms determined by the valency of manganese).

8. A composite electrode for reducing oxygen comprising:

an electrochemical catalyst A carrying out the two-electron reduction of oxygen which reduces one molecule of oxygen to produce one molecule of hydrogen peroxide, said electrochemical catalyst A being selected from the group consisting of metal material, carbon material, metal oxide, and metal complex which is represented by $\alpha L_n$ (n is the number of coordinating ligands) and comprises a central metal atom $\alpha$ and a ligand L which coordinates with the said metal atom $\alpha$; and a catalyst B carrying out the decomposition of hydrogen peroxide which decomposes one molecule of produced hydrogen peroxide to regenerate one-half molecule of oxygen, said catalyst B being a metal oxide represented by $\beta O_x$ ($\beta$ is a metal element, and x is the number of oxygen atoms determined from the valency) or a hydrogen peroxide decomposing enzyme, wherein the electrochemical catalyst A and the catalyst B are supported on an electrically conductive substrate, the catalyst B being electrically insulated so that electrons do not transfer directly or through the electron conductive material between catalyst B and either or both of the electrically conductive substrate or the electrochemical catalyst A.

9. The composite electrode according to claim 8, wherein the electrochemical catalyst A serves as an electrically conductive substrate.

10. The composite electrode according to claim 8, wherein the catalyst B is dispersed in a proton-conductive polymer.

11. The composite electrode according to claim 8, wherein the electrochemical catalyst A is a metal complex which is represented by $\alpha L n$ (n is the number of coordinating ligands) and comprises a central metal atom $\alpha$ and a ligand L which coordinates with the said metal atom $\alpha$, the ligand is being a monodentate ligand or multidentate ligand, both of them containing nitrogen atom.

12. The composite electrode according to claim 11, wherein the ligand has a porphyrin ring or phthalocyanine ring.

13. The composite electrode according to claim 12, wherein the porphyrin ring or phthalocyanine ring has at least one polymerizable functional group.

14. The composite electrode according to claim 8, wherein the catalyst B is a metal oxide represented by $\beta O_x$ ($\beta$ is a metal element, and x is the number of oxygen atoms determined by the valency of the metal element), and wherein the metal oxide is a perovskite oxide or manganese oxide represented by MnOy (y is the number of oxygen atoms determined by the valency of manganese).

15. The composite electrode according to claim 8, wherein the metal oxide is a perovskite oxide, and wherein the perovskite oxide is a $La_xSr_{1-x}MnO_3$ (x=0 to 0.5).

16. A power generation cell comprising:
a positive electrode comprising a composite electrode for reducing oxygen, said composite electrode comprising an electrochemical catalyst A that produces hydrogen peroxide by two- electron reduction of oxygen and a catalyst B that decomposes the produced hydrogen peroxide to oxygen, wherein an electrode potential of the composite electrode is set at an oxygen reduction potential of the electrochemical catalyst A, and wherein the oxygen regenerated from the produced hydrogen peroxide by the catalyst B is subjected to the two-electron reduction by the electrochemical catalyst A, thereby producing hydrogen peroxide repeatedly;
a negative electrode which carries out the oxidation reaction of an active material for the negative electrode active material or fuel material; and an electrolyte
wherein the electrochemical catalyst A and the catalyst B are supported on an electrically conductive substrate, the catalyst B being electrically insulated so that electrons do not transfer directly or through the electron conductive material between catalyst B and either or both of the electrically conductive substrate or the electrochemical catalyst A.

17. The power generation cell according to claim 16, wherein the electrochemical catalyst A is a metal complex which is represented by $\alpha L n$ (n is the number of coordinating ligands) and comprises a central metal atom $\alpha$ and a ligand L which coordinates with the said metal atom $\alpha$, and the catalyst B is a metal oxide represented by $\beta O_x$ ($\beta$ is a metal element, and x is the number of oxygen atoms determined from the valency of the metal element) or a hydrogen peroxide decomposing enzyme.

18. The power generation cell according to claim 16, wherein the cell is a fuel cell in which the positive electrode is an air electrode and the negative electrode is a fuel electrode, and the positive electrode and the fuel electrode are connected through a proton-conductive ion exchange membrane.

19. The power generation cell according to claim 16, wherein the cell is an air cell using a metal selected from the group consisting of zinc, magnesium and aluminum, for the negative electrode.

20. The power generation cell according to claim 16, wherein at least one of the negative electrode and the electrolyte comprises a molecule which is excited by light and electrochemically oxidizes a carbohydrate, said carbohydrate being supplied while optically irradiating said molecule and oxidized at the negative electrode by the molecule, the cell thereby generating electromotive force between the positive electrode and the negative electrode.

21. A method of operating a power generation cell comprising a positive electrode and a negative electrode, the positive electrode comprising a composite electrode for reducing oxygen comprising an electrochemical catalyst A that produces hydrogen peroxide by two-electron reduction of oxygen and a catalyst B that decomposes the produced hydrogen peroxide to oxygen, wherein an electrode potential of the composite electrode is set at an oxygen reduction potential of the electrochemical catalyst A, and the oxygen regenerated from the produced hydrogen peroxide by the catalyst B is subjected to the two-electron reduction by the electrochemical catalyst A to produce hydrogen peroxide repeatedly, the negative electrode oxidizing an active material for the negative electrode or a fuel, and wherein the electrochemical catalyst A and the catalyst B are supported on an electrically conductive substrate, the catalyst B being electrically insulated so that electrons do not transfer directly or through the electron conductive material between catalyst B and either or both of the electrically conductive substrate or the electrochemical catalyst A, said method comprising imparting a molecule which electrochemically oxidizes a carbohydrate being excited by light, to the negative electrode and/or the electrolyte, supplying the carbohydrate while optically irradiating the molecule, and oxidizing the carbohydrate at the negative electrode by the molecule.

* * * * *

UNITED STATES PATENT AND TRADEMARK OFFICE
CERTIFICATE OF CORRECTION

PATENT NO. : 6,939,630 B2
DATED : September 6, 2005
INVENTOR(S) : Tadashi Sotomura et al.

It is certified that error appears in the above-identified patent and that said Letters Patent is hereby corrected as shown below:

Column 22,
Line 46, after "or" insert -- metal --, and change "ε" to -- β --.

Column 23,
Line 23, delete "is".
Line 56, after "electrolyte" insert -- , --.

Signed and Sealed this

Seventh Day of February, 2006

JON W. DUDAS
*Director of the United States Patent and Trademark Office*